United States Patent
Cherpinsky et al.

(10) Patent No.: US 6,887,334 B2
(45) Date of Patent: May 3, 2005

(54) THIN FILM LAMINATION-DELAMINATION PROCESS FOR FLUOROPOLYMERS

(75) Inventors: Michael J. Cherpinsky, Dayton, NJ (US); Jeffrey D. Moulton, Morristown, NJ (US); Yuan-Ping Robert Ting, Plainsboro, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/351,920

(22) Filed: Jan. 27, 2003

(65) Prior Publication Data

US 2004/0144482 A1 Jul. 29, 2004

(51) Int. Cl.⁷ .............................. B32B 7/06; B32B 7/12; B32B 31/06; B32B 31/12; B32B 33/00
(52) U.S. Cl. ................... 156/238; 156/241; 156/249; 156/289; 428/214; 428/215
(58) Field of Search ................. 156/238, 231, 156/234, 235, 237, 241, 247, 249, 289, 344, 230; 428/44, 47, 54–56, 68, 76, 212, 214, 215, 216

(56) References Cited

U.S. PATENT DOCUMENTS

| | | | |
|---|---|---|---|
| 3,480,580 A | 11/1969 | Joyner et al. | 260/29.6 |
| 3,481,910 A | 12/1969 | Brunso | 260/78.4 |
| 4,510,301 A | 4/1985 | Levy | 526/254 |
| 4,519,969 A | 5/1985 | Murakami | 264/210.7 |
| 4,544,721 A | 10/1985 | Levy | 526/249 |
| 4,612,155 A | 9/1986 | Wong et al. | 264/176 R |
| 4,659,625 A | 4/1987 | Decroly et al. | 428/412 |
| 4,677,017 A | 6/1987 | DeAntonis et al. | 428/214 |
| 4,751,270 A | 6/1988 | Urawa et al. | 525/244 |
| 4,826,955 A | 5/1989 | Akkapeddi et al. | 528/324 |
| 5,139,878 A | 8/1992 | Kim et al. | 428/421 |
| 5,218,049 A | 6/1993 | Yamamoto et al. | 525/97 |
| 5,541,267 A | 7/1996 | Akkapeddi et al. | 525/432 |
| 5,783,273 A | 7/1998 | Yamamoto et al. | 428/35.9 |
| 5,817,386 A | * 10/1998 | Adamko et al. | 428/41.3 |
| 5,912,070 A | 6/1999 | Miharu et al. | 428/214 |
| 5,985,076 A | * 11/1999 | Misuda et al. | 156/230 |
| 6,296,732 B1 | * 10/2001 | Enlow et al. | 156/209 |

FOREIGN PATENT DOCUMENTS

WO    WO 99/24256    5/1999

* cited by examiner

Primary Examiner—Christopher A. Fiorilla
Assistant Examiner—Sing P Chan
(74) Attorney, Agent, or Firm—Virginia Szigeti

(57) ABSTRACT

A process for forming thin film laminations of thin fluoropolymer films to receiver sheets, more particularly, the production of very thin, transferable fluoropolymer films. A thin fluoropolymer base layer is applied onto a support layer, which may be a thicker film. The support layer/thin base layer is then laminated to a receiver sheet, followed by stripping away the support layer, leaving the base film on the receiver sheet.

34 Claims, No Drawings

THIN FILM LAMINATION-DELAMINATION PROCESS FOR FLUOROPOLYMERS

BACKGROUND OF THE INVENTION

1. Field of the Invention

The invention relates to film laminations of thin fluoropolymer films to polymeric receiver sheets. More particularly, the invention pertains to the production of very thin, transferable fluoropolymer films having improved thermal stability.

2. Description of the Related Art

It is well known in the art to produce single layer and multilayer fluoropolymer films. See, for example, U.S. Pat. Nos. 4,677,017; 4,659,625 and 5,139,878. Many fluoropolymer materials are commonly known for their excellent moisture and vapor barrier properties, and therefore are desirable components of packaging films, particularly lidding films and blister packages. In some applications it is also desirable to orient the films to further increase the properties of the films. For example, for a push through lidding used to package pharmaceuticals, it may be desirable to monoaxially orient the film in order to achieve one direction push through of the product. For high strength lidding, a biaxially oriented film would be desired. Oriented fluoropolymer films have also been shown to exhibit improved moisture barrier properties over non-oriented fluoropolymer films.

Fluoropolymers such as poly(chlorotrifluoroethylene) (PCTFE) are exceptionally difficult to orient due to their extremely fast crystallization rate and thermally induced self-orientation. The fast crystallization rate of PCTFE produces a highly crystalline structure that hinders orientation and actually prevents further orientation beyond a certain point. Its thermally induced self-orientation results in a film which, upon unconstrained heating, self extends in the machine or longitudinally stretched direction and shrinks in the transverse direction. U.S. Pat. No. 4,510,301 discloses oriented films containing a copolymer of 40 to 60 mole percent ethylene and chlorotrifluoroethylene. U.S. Pat. No. 4,519,969 discloses a biaxially stretched film and a method for the manufacture thereof, containing at least 90 mole % of ethylene-tetrafluoroethylene copolymer. Various attempts have also been made to produce a multilayer fluoropolymer film structures with thin layers of fluoropolymer. Most emphasis has focused on the selection of the adhesive materials. U.S. Pat. No. 4,677,017 discloses coextruded multilayer films which include a fluoropolymer and a thermoplastic film which are joined by the use of an adhesive polymer. U.S. Pat. No. 4,659,625 discloses a fluoropolymer multilayer film structure which utilizes a vinyl acetate polymer adhesive layer. U.S. Pat. No. 5,139,878, which is incorporated herein by reference, discloses a fluoropolymer film structure using an adhesive layer of modified polyolefins. However, there is a need in the art for a thin fluoropolymer film suitable for use in multilayered packaging films.

There is also a need in the art to have the capability to make stretchable and transferable thin fluoropolymer films at a low cost using conventional equipment. Current fluoropolymer thin film laminates are limited by laminate processing and the costs associated with handling very thin films, thereby requiring the formation of thick fluoropolymer films on receiver sheets. Specifically, currently known techniques require that fluoropolymer films have a minimum thickness of at least about 50 gauge (0.5 mil; 12.5 μm) due to the limitations of the extrusion and lamination processes. In particular, the high melt temperatures required by coextrusion or extrusion coating processes makes it impossible to introduce a thin fluoropolymer film onto certain polymeric receiver materials, e.g. polyvinyl chloride (PVC). Accordingly, in order to laminate, coextrude or extrusion coat certain fluoropolymer films with PVC it is necessary to use thicker fluoropolymer films. However, in many applications, it is desirable to have a thinner fluoropolymer film, i.e. a fluoropolymer film having a thickness of from about 4 gauge (0.04 mil; 1 μm) to about 40 gauge (0.4 mil; 10.2 μm) thick.

As mentioned above, oriented fluoropolymer films are known to exhibit improved properties, but current processing limitations also limit the extent of orientation that may be conducted on unsupported thin fluoropolymer films. Therefore, there is a need in the art to form fluoropolymer film laminates that have a good moisture barrier property and which have thicknesses of less than about 40 gauge (0.4 mil; 10.2 μm).

SUMMARY OF THE INVENTION

The invention provides a thin film lamination-delamination process comprising the steps of:
a) providing a support layer having first and second surfaces;
b) applying at least one thin fluoropolymer base layer, having first and second surfaces, onto at least one surface of said support layer, with the first surface of said at least one base layer in contact with a surface of said support layer;
c) applying an adhesive layer onto the second surface of said base layer;
d) attaching the base layer to a receiver sheet via the adhesive layer; and
e) separating the support layer from the base layer, such that the base layer remains attached to the receiver sheet.

The invention also provides a multilayered film comprising:
a) a support layer having first and second surfaces;
b) at least one thin fluoropolymer base layer having first and second surfaces on at least one surface of said support layer, with the first surface of said at least one base layer in contact with a surface of said support layer; wherein said base layer has a thickness of about 0.4 mil (10.2 μm) or less;
c) an adhesive layer on the second surface of said base layer; and
d) a receiver sheet attached to said base layer such that said adhesive layer is in contact with said receiver sheet.

The invention further provides a multilayered film comprising:
a) a receiver sheet having a surface; and
b) a thin fluoropolymer base layer attached to the receiver sheet;

wherein said base layer has a thickness of about 0.4 mil (10.2 μm) or less, and wherein said thin base layer is attached to the receiver sheet by lamination via an intermediate adhesive layer.

The invention provides a process in which a thin fluoropolymer base layer is coextruded with a support layer, which coextrusion exhibits a low interlayer bond strength between the fluoropolymer layer and the carrier layer. The fluoropolymer base layer of the invention preferably has a thickness ranging from about 4 gauge (~1 µm) to about 40 gauge (~10.2 µm), as compared to processes currently known in the art which require film thicknesses of at least 50 gauge (~12.5 µm). The support layer may be a thicker film, having thicknesses of from about 1 mil (~25 µm) and above. The interlayer bond strength is sufficient to allow the coextruded film to be adhesively laminated to a receiver sheet without delamination and subsequently mechanically delaminated from the support layer to leave a very thin fluoropolymer base layer on the receiver sheet.

DETAILED DESCRIPTION OF THE PREFERRED EMBODIMENTS

The invention provides thin film lamination-delamination process in which a coextrusion of a self-supporting, thin fluoropolymer base layer and a polymeric support layer is laminated to a receiver sheet via an intermediate adhesive layer, followed by delamination of the support layer, leaving the thin fluoropolymer base layer on the receiver sheet. The support layer has first and second surfaces and is coextruded with a fluoropolymer material to form a thin fluoropolymer base layer having first and second surfaces, with the first surface of the base layer on the second surface of the support layer. An adhesive layer is then applied onto the second surface of the base layer. This structure is then laminated to a receiver sheet such that the adhesive layer is in contact with a surface of the receiver sheet. After this lamination step, the receiver sheet and support layer are separated, leaving the base layer and adhesive layer on the receiver sheet.

Fluoropolymer materials are commonly known for their excellent chemical resistance and release properties as well as moisture and vapor barrier properties, and therefore are desirable components of packaging films. It should be understood that the thin base layer is a self-supporting film which is capable of being transferred in whole from one substrate to another. In the preferred embodiment of the invention, the thin fluoropolymer layer may be comprised of fluoropolymer homopolymers or copolymers or blends thereof as are well known in the art and are described in, for example, U.S. Pat. Nos. 4,510,301, 4,544,721 and 5,139,878. Preferred fluoropolymers include, but are not limited to, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. The most preferred fluoropolymers include homopolymers and copolymers of polychlorotrifluoroethylene. Particularly preferred are PCTFE materials sold under the trademark ACLAR® which are commercially available from Honeywell International Inc. of Morristown, N.J.

In the production of the multilayered film of the invention, a thin fluoropolymer base layer is coextruded with a support layer. Each of the base layer and the support layer have first and second surfaces and are attached such that the first surface of the base layer is in contact with the second surface of the support layer. Suitable support layer materials include materials selected from the group consisting of polyamides, polyolefins, polyvinyl chloride (PVC), polyurethanes, ethylene vinyl acetate (EVA), polyesters such as polyethylene terephthalate (PET), cyclo olefin polymers (both homopolymers and copolymers) and blends of one or more of the foregoing.

Suitable polyolefins for use herein include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), metallocene linear low density polyethylene (m-LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; polyhexene and combinations thereof.

Polyolefins such as polyethylenes are commonly differentiated based on the density which results from their numbers of chain branches per 1,000 carbon atoms in the polyethylene main chain in the molecular structure. Branches typically are $C_3$–$C_8$ olefins, and which are preferably butene, hexene or octene. For example, HDPE has very low numbers of short chain branches (less than 20 per 1,000 carbon atoms), resulting in a relatively high density, i.e. density ranges from about 0.94 gm/cc to about 0.97 gm/cc. LLDPE has more short chain branches, in the range of 20 to 60 per 1,000 carbon atoms with a density of about 0.91 to about 0.93 gm/cc. LDPE with a density of about 0.91 to about 0.93 gm/cc has long chain branches (20–40 per 1,000 carbon atoms) instead of short chain branches in LLDPE and HDPE. ULDPE has a higher concentration of short chain branches than LLDPE and HDPE, i.e. in the range of about 80 to about 250 per 1,000 carbon atoms and has a density of from about 0.88 to about 0.91 gm/cc. Illustrative copolymer and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefin is polyethylene. The most preferred polyethylenes are low density polyethylenes Suitable polyamides (nylons) within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art, including the self-condensation of lactams and the reaction products of diacids with diamines.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6, nylon 6,6/6 as well as mixtures of the same. The most preferred polyamide is nylon 6.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/ hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly (dodecamethylene terephthalamide), polyamide 6T/6I , polyamide 6/MXDT/1, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Suitable cyclo olefin polymers (homopolymers, copolymers or blends) are described, for example, in U.S. Pat. Nos. 5,218,049; 5,783,273 and 5,912,070, which are incorporated herein by reference. U.S. Pat. No. 5,218,049 discloses films composed of cyclo olefins. U.S. Pat. No. 5,783,273 discloses press-through blister packaging materials comprising a sheet of a cyclo olefin copolymer. U.S. Pat. No. 5,912,070 discloses a packaging material comprising a layer of a cyclo olefin, a layer of a polyester and an intermediate adhesive. Among the preferred are copolymers of ethylene and norbornene.

In one preferred embodiment of the invention, the support layer and the fluoropolymer base layer may optionally be coextruded with an intermediate adhesive layer positioned between the support and the base layer. This optional adhesive layer may comprise an anhydride modified alpha olefin, polypropylene, ethylene acid copolymer resins, acrylic acid or methacrylic acid modified copolymers, metallocene polymerized ethylene copolymers (e.g. ethylene/cyclo olefin copolymers, ethylene/styrene, ethylene/long side chains), ethylene vinyl acetate copolymers, acid and anhydride modified polyacrylates and olefin-acrylate copolymers, epoxy modified polyolefins and acid and anhydride modified elastomers, styrene butadiene styrene (SBS) rubbers and blends thereof.

After joining the fluoropolymer base layer and the support layer, an adhesive layer is applied onto the second surface of the base layer. Any suitable adhesive material may be employed, including those described above. Additional suitable adhesive polymers include polyurethanes, epoxies, polyesters, acrylics, modified polyolefin compositions having at least one functional moiety selected from the group consisting of unsaturated polycarboxylic acids and anhydrides thereof. Also suitable are blends of these materials. Such unsaturated carboxylic acid and anhydrides include maleic acid and anhydride, fumaric acid and anhydride, crotonic acid and anhydride, citraconic acid and anhydride, itaconic acid an anhydride and the like. The modified polyolefins suitable for use in this invention include compositions described in U.S. Pat. Nos. 3,481,910; 3,480,580; 4,612,155 and 4,751,270. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 and about 20 weight percent of the functional moiety, based on the total weight of the modified polyolefin. More preferably the functional moiety comprises from about 0.05 and about 10 weight percent, and most preferably from about 0.1 and about 5 weight percent. The modified polyolefin composition may also contain up to about 40 weight percent of thermoplastic elastomers and alkyl esters as described in U.S. Pat. No. 5,139,878. Preferred polyurethane adhesives include a two-part urethane system (both a solvent base and a water base) or a one part system. A preferred epoxy adhesive is a two part epoxy adhesive system formed from a reaction of an epoxy and an amine. Preferred acrylic adhesives include pressure sensitive adhesives. Also suitable is a 100% solid adhesive subjected to a UV or e-beam curing. The adhesive may be applied by any appropriate means in the art, such as by coating or coextrusion. It is also within the preferred embodiment of the invention that any of these adhesive materials may be utilized as an intermediate adhesive layer positioned between the support layer and the fluoropolymer base layer.

Once the adhesive layer is applied to the base layer, the support/base/adhesive structure is attached to a receiver sheet, preferably by lamination techniques described below. Suitable receiver sheets include materials selected from the group consisting of consisting of polyolefins, polyvinyl chloride, polyesters, polyamides, ethylene ethyl acrylate, ethylene acrylic acid, or cyclic olefin polymers. Suitable polyolefins include the polyolefins described above. These layers may be metallized as is known in the art. The receiver sheet may also comprise any other suitable polymeric film, a fabric (woven or non-woven) or a paper substrate. The receiver sheet is preferably a plastic material, more preferably PVC, polyolefin or cyclo olefin, and is preferably formed by extrusion. It is also within the scope of the invention that the receiver sheet may be subjected to an optional corona treatment prior this lamination step in order to improve the adhesion to the base layer. A corona treatment is a process in by which a layer of material is passed through a corona discharge station giving the surface of the layer a charge that improves its ability to bond to an adjacent layer. If conducted, it is preferably done immediately after formation of the receiver sheet.

After the support/base/adhesive structure is laminated to the receiver sheet, the support is separated from the base layer by delamination, or by pulling the support layer and the receiver sheet apart, using techniques which are well known in the art. This delamination step leaves the thin fluoropolymer base layer on the receiver sheet. Therefore, in order for the base layer to remain on the receiver sheet, it is essential that the adhesive bond strength between the base layer and the receiver sheet be stronger than the interlayer bond strength between the base layer and the support layer. Preferably, the bond strength between the base layer and the receiver sheet is at least about 2 times, more preferably at least about 3 times, the interlayer bond strength between the base layer and the support layer. In a more preferred embodiment, the interlayer bond strength between the base layer and the support layer is less than about 90 g/inch (35 g/cm), while the interlayer bond strength between the base layer and the receiver sheet is preferably greater than about 200 g/inch (79 g/cm), more preferably greater than about 300 g/inch (118 g/cm). Therefore, upon pulling the receiver sheet and the support layer apart, the bond between the base layer and the support layer will break, leaving the base layer on the receiver sheet.

Each of the support layer, fluoropolymer base layer, adhesive layer and receiver sheet may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall layer composition.

The multilayer films of this invention may be produced by conventional methods useful in producing multilayer films, including coextrusion and lamination techniques. In the preferred embodiment of the invention, the support layer and the fluoropolymer base layer are preferably attached by coextrusion. For example, the polymeric material for the individual layers are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

One advantage of coextruded films is the formation of a multilayer film in a one process step by combining molten layers of each of the film layers of the support layer and fluoropolymer base layer, as well as any other optional film layers, into a unitary film structure.

Prior art methods have heretofore required the lamination of thick fluoropolymer films (over 0.5 mil; ~12.5 $\mu$m) with suitable receiver sheets. The lamination-delamination process of the present invention allows relatively thin films, having thicknesses of from about 0.04 mil (~1 $\mu$m) to about 0.4 mil (~10.2 $\mu$m), to be applied onto such desirable receiver sheets as described above.

The combination of the fluoropolymer base layer joined with the support layer may be oriented prior to being attached to the receiver sheet. For the purposes of the present invention the term draw ratio is an indication of the increase in the dimension in the direction of draw. The layers may be drawn to a draw ratio of from 1.5:1 to 5:1 uniaxially in at least one direction, i.e. its longitudinal direction, its transverse direction or biaxially in each of its longitudinal and transverse directions. The layers may be simultaneously biaxially oriented, for example orienting a film in both the machine and transverse directions at the same. This results in dramatic improvements in clarity, strength and toughness properties, as well as an improved moisture vapor transmission rate.

Although each layer of the multilayer film structure may have a different thickness, the support layer has a preferred thickness of from about 1 mil (25 $\mu$m) to about 6 mil (150 $\mu$m), more preferably from about 2 mil (50 $\mu$m) to about 5 mil (125 $\mu$m), and most preferably from about 3 mil (75 $\mu$m) to about 4 mil (100 $\mu$m). The thin base layer has a thickness of about 0.04 mil (1 $\mu$m) to about 0.4 mil (10.2 $\mu$m), a preferred thickness of from about 0.08 mil (2 $\mu$m) to about 0.4 mil (10.2 $\mu$m), more preferably from about 0.21 mil (5 $\mu$m) to about 0.31 mil (8 $\mu$m). The adhesive layers have a preferred thickness of from about 0.04 mil (1 $\mu$m) to about 0.4 mil (10.2 $\mu$m), more preferably from about 0.12 mil (3 $\mu$m) to about 0.31 mil (8 $\mu$m). The receiver sheet preferably has a thickness of from about 0.2 mil (5 $\mu$m) to about 12 mil (300 $\mu$m), more preferably from abut 0.4 mil (10.2 $\mu$m) to about 8 mil (200 $\mu$m) and most preferably from about 0.6 mil (15 $\mu$m) to about 4 mil (100 $\mu$m). While such thicknesses are referenced, it is to be understood that other layer thicknesses may be produced to satisfy a particular need and yet fall within the scope of the present invention.

The multilayered films of this invention are useful as flat structures or can be formed, such as by thermoforming, into desired shapes. The films are useful for a variety of end applications, such as for medical packaging, pharmaceutical packaging and other industrial uses. The multilayered film of the invention are particularly useful for forming thermoformed three dimensionally shaped articles such as blister packaging for pharmaceuticals, or any other barrier packaging. This may be done by forming the film around a suitable mold and heating in a method well known in the art.

The moisture vapor transmission rate (MVTR) of such films of the invention may be determined via the procedure set forth in ASTM F1249. In the preferred embodiment, the overall multilayered film according to this invention has a MVTR of from about 1.0 or less g/100 in$^2$/day (15.5 g/m$^2$/day) of the overall film at 37.8° C. and 100% RH, preferably from 0.1 to about 0.7 g/100 in$^2$/day (1.5 to about 10.5 g/m$^2$/day) of the overall film, and more preferably from 0.01 to about 0.06 g/100 in$^2$/day (0.15 to about 0.93 g/m$^2$/day) of the overall film, as determined by water vapor transmission rate measuring equipment available from, for example, Mocon.

The oxygen transmission rate (OTR) of the films of the invention may be determined via the procedure of ASTM D-3985 using an OX-TRAN 2/20 instrument manufactured by Mocon., operated at 23° C., 0% RH. In the preferred embodiment, the overall multilayered film according to this invention has an OTR of from about 50 or less cc/100 in$^2$/day (775 g/m$^2$/day), preferably from about 0.001 to about 20 cc/100 in²/day (0.015 to about 310 g/m²/day), and more preferably from about 0.001 to about 10 cc/100 in²/day (0.015 to about 150 cc/m²/day).

It is also within the scope of the invention that a thin fluoropolymer base film may be attached on both opposing surfaces of the support layer. In this embodiment, the same steps as described above would be repeated with the second base layer being adhesively laminated to a second receiver sheet, followed by delamination of said support layer.

The following non-limiting examples serve to illustrate the invention.

EXAMPLE 1

A fluoropolymer/polyolefin film was coextruded in two layers via a cast film process. The extruded film contains sufficient antiblock in the base and/or supporting layers to prevent blocking in roll form after extrusion. The base fluoropolymer layer has an average thickness of about 0.3 mil (7.62 μm). The supporting film has an average thickness of about 2 mil (50 μm). The fluoropolymer film is a PCTFE homopolymer. The supporting film is low density polyethylene (LDPE) and no tie resin is used to bond the two layers. To improve adhesion of the PCTFE layer to a receiver sheet, the free of the base layer was corona treated, producing a film with a minimum surface energy of 45 dyne, as tested by either surface energy pens or water contact angle techniques.

The free side of the base fluoropolymer layer was coated with a two-part urethane adhesive consisting of 100 parts epoxy/amine and 12 parts of polyol/isocyanate applied at a rate of 1.5 lb. per ream (3000 sq. feet) (2.4 g/m²). This adhesive was applied by means of rotogravure application process through a Faustal coater/laminator machine.

The adhesive was dried in a conventional forced air tunnel oven at 160° F. (71° C.) for twenty seconds and then directly laminated at a combiner nip set at room temperature, with sufficient pressure to adhere to a 1.5 mil (38 μm) receiver sheet of PVC. The subsequent lamination was then wound onto a core.

After a twenty-four hour cure, the adhesively laminated base layer was separated from the support layer during the slitting process. The laminated fluoropolymer (base): PVC (receiver) laminate was wound onto one core while the polyethylene (support) layer was simultaneously wound onto a separate core.

The thin film laminate had a MVTR (moisture vapor transmission rate) of 0.06 g/100 in²/day (0.93 g/m²/day).

EXAMPLE 2

Example 1 was repeated except a coextruded support film containing separate resin layers was made. The support film was a 0.2 mil (5 μm) tie layer comprised of ethylene vinyl acetate mixed with polyethylene and a separate layer of 1 mil (25 μm) linear low density polyethylene (LLDPE). The tie layer surface was in contact with the 0.3 mil (7.62 μm) PCTFE layer resin and the LLDPE layer. The interlayer adhesion between the tie layer and the fluoropolymer film was sufficiently weaker than the interlayer adhesion between the tie layer and the LLDPE resulting in the separation of the fluoropolymer film from the tie layer/LLDPE support film when separated at a slitter machine. The resulting laminate had a MVTR of 0.06 g/100 in²/day (0.93 g/m²/day).

EXAMPLE 3

Example 2 was repeated except the second side of the fluoropolymer film was coated with the adhesive of Example 1, dried in an oven, and directly laminated to 0.7 mil (17.8 μm) clear PVC film. Upon lamination to the PVC film, the support layer consisting of tie layer and LLDPE was found to be easily removed from the first side of the fluoropolymer film. The laminate had a MVTR of 0.06 g/100 in 2/day (0.93 g/m² day).

EXAMPLE 4

Example 2 was repeated except during the extrusion process, in-line machine direction orientation at a 1.5 to 1 draw ratio is performed. Upon separation of the fluoropolymer base film from the support film, the fluoropolymer film had a thickness of 0.2 mil (5 μm) and a MVTR of 0.03 g/100 in²/day (0.47 g/m²/day).

It can be seen that this invention provides for a very thin fluoropolymer film on a receiver sheet in a simple and cost-effective manner.

What is claimed is:

1. A thin film lamination-delamination process comprising the steps of:
   a) providing a support layer having first and second surfaces;
   b) applying at least one thin polychlorotrifluoroethylene base layer, having first and second surfaces, onto at least one surface of said support layer, with said first surface of said at least one base layer overlying a surface of said support layer, wherein said base layer has a thickness of from about 0.04 mil (1 μm) to about 0.4 mil (10.2 μm);
   c) applying an adhesive layer onto said second surface of said base layer;
   d) attaching the base layer to a receiver sheet via said adhesive layer, wherein the bond strength between said base layer and said receiver sheet is at least about 2 times the interlayer bond strength between said base layer and said support layer; and
   e) separating said support layer from said base layer, such that said base layer remains attached to said receiver sheet.

2. The process of claim 1 further comprising conducting steps b) through e) on said second surface of said support layer.

3. The process of claim 1 further comprising attaching said support layer and said base layer via an intermediate adhesive layer.

4. The process of claim 1 wherein the bond strength between said base layer and said receiver sheet is at least about 3 times the interlayer bond strength between said base layer and said support layer.

5. The process of claim 1 wherein the bond strength between said base layer and said receiver sheets is greater than about 200 g/inch (79 g/cm) and the interlayer bond strength between said base layer and said support layer is less than about 90 g/inch (35 g/cm).

6. The process of claim 1 wherein said support layer comprises a material selected from the group consisting of polyolefins, polyamides, polyesters, polyurethanes, polyvinyl chloride, ethylene vinyl acetate, cyclo olefin polymers and blends thereof.

7. The process of claim 1 wherein said receiver sheet comprises a material selected from the group consisting of polyolefins, polyvinyl chloride, polyesters, polyamides, ethylene ethyl acrylate, ethylene acrylic acid, cyclic olefin polymers, fabric and paper.

8. The process of claim 1 wherein said receiver sheet comprises polyvinyl chloride.

9. The process of claim 1 wherein said support layer comprises a polyethylene selected from the group consisting of ultra low density polyethylene, low density polyethylene, linear low density polyethylene, metallocene linear low density polyethylene, medium density polyethylene, high density polyethylene and combinations thereof.

10. The process of claim 1 wherein said support layer comprises a linear low density polyethylene.

11. The process of claim 1 wherein said adhesive layer comprises a material selected from the group consisting of polyurethanes, epoxies, polyesters, acrylics, anhydride modified polyolefins, anhydride modified alpha olefins, polypropylene, ethylene acid copolymer resins, acrylic acid or methacrylic acid modified copolymers, metallocene polymerized ethylene copolymers, ethylene vinyl acetate copolymers, acid and anhydride modified polyacrylates and olefin-acrylate copolymers, epoxy modified polyolefins and acid and anhydride modified elastomers, styrene butadiene styrene rubbers and blends thereof.

12. The process of claim 1 wherein said base layer and said support layer are coextruded.

13. The process of claim 1 wherein said adhesive layer is applied to said base layer by coating.

14. The process of claim 1 wherein said support layer is separated from said base layer by pulling said support layer and the said sheet apart.

15. The process of claim 1 wherein said base layer and said support layer are oriented at a draw ratio of at least 1.5:1 in at least one direction prior to attaching said base layer to said receiver sheet.

16. The process of claim 15 wherein said layer and support layer are oriented uniaxially at a draw ratio of from 1.5:1 to 5:1.

17. A thin film lamination-delamination process comprising the steps of:
   a) providing a support layer having first and second surfaces;
   b) applying at least one thin polychlorotrifluoroethylene base layer, having first and second surfaces, onto at least one surface of said support layer, with said first surface of said at least one base layer overlying a surface of said support layer, wherein said base layer has a thickness of from about 0.04 mil (1 µm) to about 0.4 mil (10.2 µm);
   c) applying an adhesive layer onto said second surface of said base layer;
   d) orienting said base layer and said support layer at a draw ratio of at least 1.5:1 in at least one direction;
   e) attaching said oriented base layer to a receiver sheet via said adhesive layer, wherein the bond strength between said base layer and said receiver sheet is at least about 2 times the interlayer bond strength between said base layer and said support layer; and
   f) separating said support layer from said base layer, such that said base layer remains attached to said receiver sheet.

18. The process of claim 17 wherein the bond strength between said base layer receiver sheet is greater than about 200 g/inch (79 g/cm) and the interlayer bond strength between said base layer and said support layer is less than about 90 g/inch (35 g/cm).

19. A thin film lamination-delamination process comprising the steps of:
   a) providing a support layer comprising a polyolefin and having first and second surfaces;
   b) applying at least one thin polychlorotrifluoroethylene base layer, having first and second surfaces, onto at least one surface of said support layer, with said first surface of said at least one base layer overlying a surface of said support layer, said base layer having a thickness of from about 0.04 mil (1 µm) to about 0.4 mil (10.2 µm);
   c) applying an adhesive layer onto said second surface of said base layer;
   d) attaching the base layer to a polyvinyl chloride receiver sheet via said adhesive layer, wherein the bond strength between said base layer and said receiver sheet is at least about 2 times the interlayer bond strength between said base layer and said support layer; and
   e) separating said support layer from said base layer, such that said base layer remains attached to said receiver sheet.

20. The process of claim 19 wherein said base layer and said support layer are oriented at a draw ratio of at least 1.5:1 in at least one direction prior to attaching said base layer to said receiver sheet.

21. The process of claim 20 wherein the bond strength between said base layer and said receiver sheet is greater than about 200 g/inch (79 g/cm) and the interlayer bond strength between said base layer and said support layer is less than about 90 g/inch (35g/cm).

22. A multilayered film comprising:
   a) a support layer having first and second surfaces;
   b) at least one thin polychlorotrifluoroethylene base layer having first and second surfaces on at least one surface of said support layer, with the first surface of said at least one base layer overlying a surface of said support layer; wherein said base layer has a thickness of from about 0.04 mil (1 µm) to about 0.4 mil (10.2 µm);
   c) an adhesive layer on the second surface of said base layer; and
   d) a receiver sheet attached to said base layer such that said adhesive layer is in contact with said receiver sheet, wherein the bond strength between said base layer and said receiver sheet is at least about 2 times the interlayer bond strength between said base layer and said support layer.

23. The multilayered film of claim 22 further comprising an intermediate adhesive layer positioned between said support layer and said base layer.

24. The multilayered film of claim 22 wherein the bond strength between said base layer and said receiver sheet is greater than about 200 g/inch (79 g/cm) and the interlayer bond strength between said base layer and said support layer is less than about 90 g/inch (35 g/cm).

25. The multilayered film of claim 22 wherein said support layer has a thickness of from about 1 mil (25 µm) to about 6 mil (150 µm).

26. The multilayered film of claim 22 wherein said support layer comprises a material selected from the group consisting of polyolefins, polyamides, polyesters, polyurethanes, polyvinyl chloride, ethylene vinyl acetate, cyclo olefin polymers and blends thereof.

27. The multilayered film of claim 22 wherein said receiver sheet comprises a material selected from the group consisting of polyolefins, polyvinyl chloride, polyesters, polyamides, ethylene ethyl acrylate, ethylene acrylic acid, cyclic olefin polymers, fabric and paper.

28. The multilayered film of claim 27 wherein said receiver sheet comprises a polyethylene selected from the group consisting of ultra low density polyethylene, low density polyethylene, linear low density polyethylene, metallocene linear low density polyethylene, medium density polyethylene, high density polyethylene and combinations thereof.

29. The multilayered film of claim 22 wherein said receiver sheet comprises polyvinyl chloride.

30. The multilayered film of claim 22 wherein said adhesive layer comprises a material selected from the group consisting of polyurethanes, epoxies, polyesters, acrylics, anhydride modified polyolefins, anhydride modified alpha olefins, polypropylene, ethylene acid copolymer resins, acrylic acid or methacrylic acid modified copolymers, metallocene polymerized ethylene copolymers, ethylene vinyl acetate copolymers, acid and anhydride modified polyacrylates and olefin-acrylate copolymers, epoxy modified polyolefins and acid and anhydride modified elastomers, styrene butadiene styrene rubbers and blends thereof.

31. The multilayered film of claim 22 wherein said base layer and said support layer are coextruded.

32. The multilayered film of claim 22 wherein said base layer and said support layer are oriented at a draw ratio of at least 1.5:1 in at least one direction.

33. The multilayered film of claim 32 wherein said base layer and support layer are oriented uniaxially at a draw ratio of at least 1.5:1 to 5:1.

34. A multilayered film comprising:

a) a polyolefin support layer having first and second surfaces;

b) at least one thin polychlorotrifluoroethylene base layer having first and second surfaces on at least one surface of said support layer, with the first state of said at least one base layer overlying a surface of said support layer; wherein said base layer has a thickness of from about 0.04 mil (1 $\mu$m) to about 0.4 mil (10.2 $\mu$m);

c) an adhesive layer on the second surface of said base layer; and d) a polyvinyl chloride receiver sheet attached to said base layer such that said adhesive layer is in contact with said receiver sheet, wherein the bond strength between said base layer and said receiver sheet is greater than about 200 g/inch (79 g/cm) and the interlayer bond strength between said base layer and said support layer is less than about 90 g/inch (35 g/cm).

* * * * *